J. C. MONAHAN.
WHEEL CHOCK DEVICE.
APPLICATION FILED OCT. 18, 1919.
1,401,350.
Patented Dec. 27, 1921.
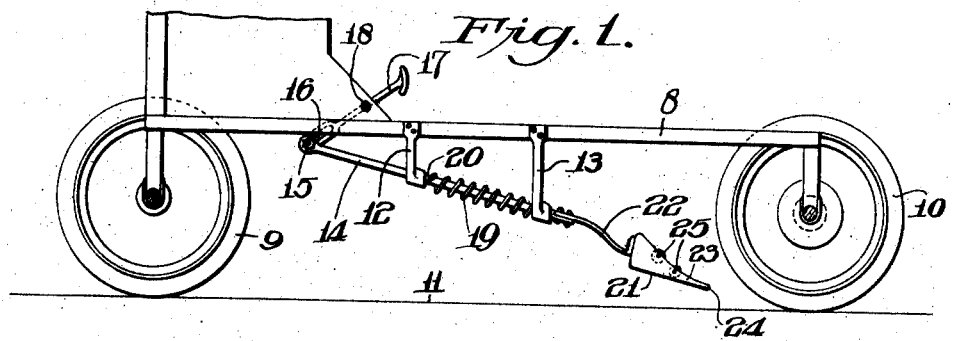
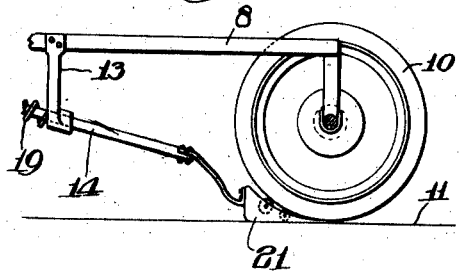
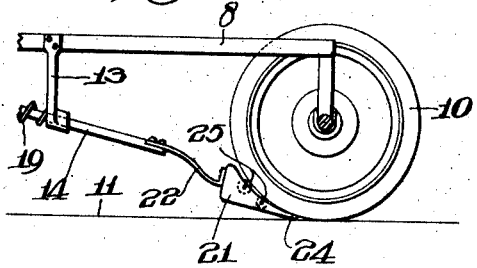
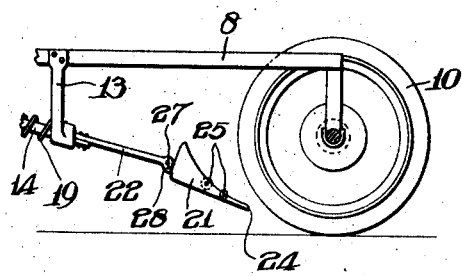
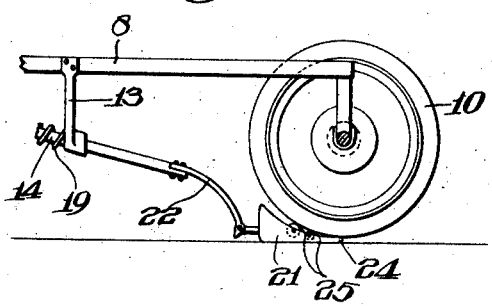
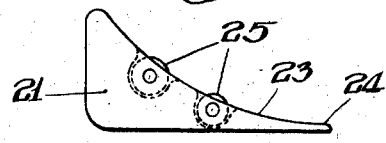
Witnesses:
Inventor
John C. Monahan,
By Joshua R. H. Potts
his Attorney.

UNITED STATES PATENT OFFICE.

JOHN C. MONAHAN, OF PHILADELPHIA, PENNSYLVANIA.

WHEEL-CHOCK DEVICE.

1,401,350.  Specification of Letters Patent.  Patented Dec. 27, 1921.

Application filed October 18, 1919. Serial No. 331,536.

*To all whom it may concern:*

Be it known that I, JOHN C. MONAHAN, a citizen of the United States, residing at Philadelphia, in the county of Philadelphia and State of Pennsylvania, have invented certain new and useful Improvements in Wheel-Chock Devices, of which the following is a specification.

One object of my invention is to provide an improved wheel chock device for use on vehicles, such as automobiles, and which can be quickly and easily operated to provide a chock for the wheel of the automobile.

Another object is to make my improved wheel chock device of a strong and durable construction and which can be operated by the driver of a vehicle to effectively chock a wheel and can be used with or without the usual brake to prevent a vehicle from moving forwardly after the chock is applied.

These objects, and other advantageous ends which will be described hereinafter, I attain in the following manner, reference being had to the accompanying drawings in which—

Figure 1 is a side elevation showing my invention applied to a vehicle; the chock being in a normal position, Fig. 2 is a fragmentary elevation showing the chock in a position initially engaging the wheel and roadway, Fig. 3 is a view of similar nature to Fig. 2 showing the chock having moved to its fullest extent to provide the stopping of the wheel, Fig. 4 is a fragmentary side elevation showing a slightly modified form of my invention in its normal position, Fig. 5 is a view of similar nature to Fig. 4 showing the chock in its full extended position, having been moved from the position shown in Fig. 4 in order to stop the wheel, Fig. 6 is a side elevation of the chock shoe, and Fig. 7 is a central sectional elevation taken longitudinally through the chock shoe of the modification shown in Figs. 4 and 5.

Referring to Figs. 1 to 3 inclusive, 8 represents the frame of a vehicle having wheels 9 and 10 thereon and 11 represents the roadway. Two hangers 12 and 13 are secured to the frame 8, the hanger 13 being longer than the hanger 12. These hangers form a slidable bearing for a rod 14 which has a bolt 15 which extends into a slot 16 in a treadle lever 17; said treadle lever being pivoted at 18. By this arrangement the rod 14 is slidably mounted and inclined toward the rear wheel 10. A spring 19 has one end connected at 20 to the rod 14 and the other end adapted to engage the hanger 13. This spring 19 tends to normally keep the rod 14 in the position shown in Fig. 1. A chock shoe 21 is secured, by means of a spring strip 22, to the end of the rod 14. This chock shoe is tapered toward its rear end as shown at 23 and when the treadle is moved forwardly the rod 14 will be slid in the hangers 12 and 13 to move the chock shoe 21 from the position shown in Fig. 1 to the position shown in Fig. 2 so that the pointed end 24 engages between the wheel 10 and the roadway 11. After this action takes place any forward movement of the wheel 10 will tend to ride up upon the chock shoe 21 and drag it into the position shown in Fig. 3; the spring strip flexing and the rod 14 sliding slightly downward to permit this action. The chock shoe is provided with rollers 25 which are spaced inwardly from the end 24 so that after the wheel 10 has ridden up upon the chock shoe, any further rotation of the wheel 10 will merely tend to rotate the rollers 25 and will not act to pull the shoe any farther under the wheel and also the rotation of the wheel 10 when on the rollers 25 will not tend to move the vehicle forward. At the same time the chock shoe 21 will serve as a drag or brake in connection with the roadway 11.

In the form of my invention shown in Figs. 4, 5 and 7 I have illustrated a plunger 26 slidable within the chock shoe 21; this plunger being pivoted at 27 to the end of the spring strip 22; said spring strip having a lug 28 thereon adapted, when in normal position, to engage the surface 29 of the chock shoe and thereby hold the chock shoe in the position, for example, as shown in Fig. 4. In this form of my invention when the rod 14 is moved at an angle rearwardly, the spring strip 22 will flex and the chock shoe 21 will pivot at 27 so that the shoe can rest flat upon the roadway and the action of the wheel on the chock shoe will move the same against the action of a spring 30 which is interposed between the head 31 of the plunger 26 and an end plate 32 which is secured to the chock shoe 21. When the chock shoe has been released, either by a slight rear movement of the wheel 10 or by pushing downwardly on the treadle lever 17, the spring 30 will tend to move the chock shoe 21 into engagement with the lug 28 and the chock shoe will, after the rod 14 has been slid upwardly, be held in the position shown in Fig. 4 ready to be again moved toward the wheel.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. The combination with a vehicle of a rod slidably mounted thereon; a chock shoe; and a resilient flexible connection between said chock shoe and the slidable rod, said flexible connection being of sufficient rigidity to hold the chock shoe in a position so that when the rod is slid the chock shoe will initially engage between a wheel of the vehicle and the roadway after which said flexible connection will permit the shoe to be forced downwardly in engagement with the roadway and the wheel to ride upon it; substantially as described.

2. The combination with a vehicle of a rod; inclined bearings for said rod whereby the rod can slide in a straight inclined direction; a tapered chock shoe; a resilient flexible connection between the chock shoe and the lower portion of the slidable rod, said flexible connection being of sufficient rigidity to hold the chock shoe in a position so that when the rod is slid the pointed end of the chock shoe will initially engage between a wheel of the vehicle and the roadway; and means for sliding said rod in said direction whereby after said initial engagement of the pointed end of the chock shoe between the wheel and the roadway the flexible connection will permit the shoe to be forced downwardly with one face in engagement with the roadway and permit the wheel to ride upwardly on the other face; substantially as described.

In testimony whereof I have signed my name to this specification in the presence of two subscribing witnesses.

JOHN C. MONAHAN.

Witnesses:
CHAS. E. POTTS,
ANNA RENTON.